Jan. 16, 1962    C. J. DE GRAVE, JR., ET AL    3,016,795

SUBSTAGE LIGHTING MEANS FOR MICROSCOPES

Filed Dec. 28, 1959

INVENTORS
CHARLES J. DeGRAVE JR.
HAROLD W. STRAAT
BY
ATTORNEY

United States Patent Office 3,016,795
Patented Jan. 16, 1962

3,016,795
SUBSTAGE LIGHTING MEANS FOR MICROSCOPES
Charles J. De Grave, Jr., Chili, and Harold W. Straat, Irondequoit, N.Y., assignors to Bausch & Lomb Incorporated, a corporation of New York
Filed Dec. 28, 1959, Ser. No. 862,269
4 Claims. (Cl. 88—40)

The present invention relates to substage lighting means for microscopes and more particularly it relates to mechanism for converting said means from an Abbe type to a variable focus type of light condensing mechanism.

Optical condensers as commonly used in substage lighting for microscopes are constructed according to the well-known Abbe type of condenser as shown in FIG. 1 of U.S. Patent No. 1,716,308 issued to L. V. Foster, or else according to the more recent variable focusing type of condenser as shown and described in U.S. Patent No. 2,373,559 issued to L. B. Hall. These two types of condensers are generically similar in optical form and their functions in miscroscopy are complementary so that both types are used customarily in the less critical examinations of specimens and the operation thereof is well known in the microscope art.

Since the two above-mentioned types of microscope substage condensers are very similar in optical form, it is desirable in the interest of economy to combine the functions of each type into a single condenser by providing a convertible type of lens mounting for the lens parts. However, mere modifications to existing lens mounts fall far short of providing such a convertible condenser mounting because of the requirement that it is necessary to make the minimum separation of the upper and lower lens parts of the focusing type condenser equal to the fixed separation of the lens parts in the Abbe type of condenser. Interference or collision of the parts of the aforesaid lens mounts would occur so as to prevent the attainment of the necessary lens separation. The most acceptable solution of the problem lies in providing a novel type of traveling connector mechanism for uniting alternatively the upper lens member to a stationary stage member whereby a focusing type of condenser is afforded, or uniting said upper lens member to the lower lens member for motion in unison therewith whereby an Abbe type condenser is provided.

It is an object of this invention to provide a novel microscope substage lighting mechanism which is convertible from an Abbe type of substage condenser to a variable focus type of substage condenser in a quick and easy manner while maintaining the usual performance qualities of both types of illuminating mechanism.

It is a further object of this invention to provide such a device by simple mechanism of low cost which embodies no loose parts, is easy to manufacture, requires no tools to effect conversion of the mechanism and needs substantially no servicing.

Further objects and advantages will be apparent in the details of construction and the form, arrangement and combination of parts of this invention by reference to the specification herebelow taken together with the accompanying drawing, wherein.

Figure 1:
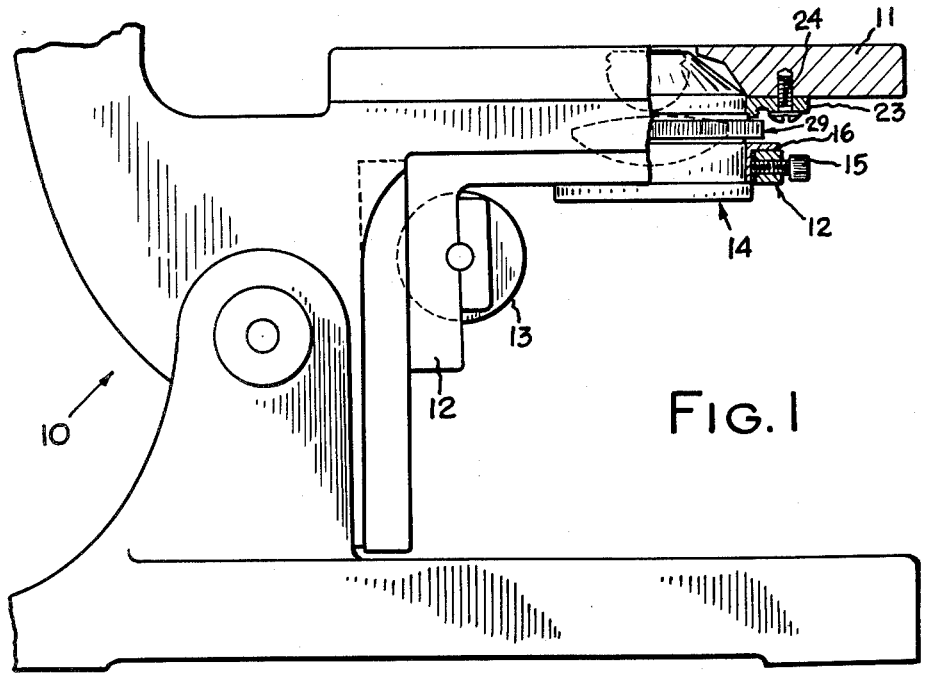
FIG. 1 represents a side elevation of a microscope, partly broken away and shown in section, embodying our invention.
Figures 2, 3:
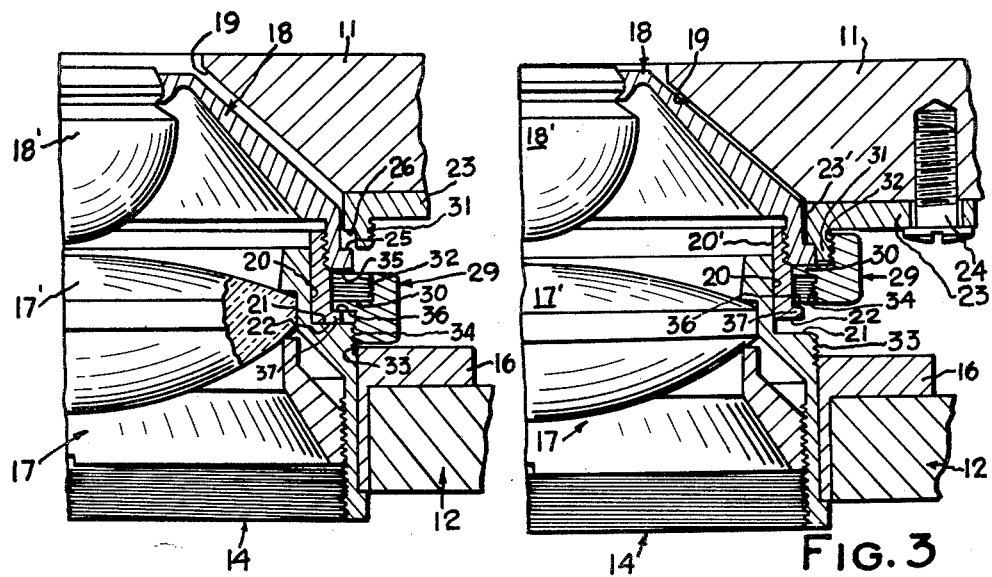
FIG. 2 is an enlarged partial midsectional view of the substage condenser parts of our invention.
FIG. 3 is a further midsectional view similar to FIG. 2 showing a second operative position of the substage condenser.

In FIG. 1 of the drawing there is shown a microscope, generally designated by the numeral 10, having a fixed stage 11. Mounted thereunder in the usual manner is a focusable substage 12 which is actuated by a control knob 13. A substage lighting mechanism generally designated by the numeral 14 is supported in the substage 12 and is secured therein in any preferred manner such as by a lock screw 15 which bears frictionally against the substage lighting mechanism through an intermediate flexible walled bushing 16 so that pressure may be applied to retain said mechanism. The substage lighting mechanism 14 is composed of two principal parts, namely, the lower lens cell 17 and the upper lens cell 18, the lower cell being secured as aforementioned for motions in unison with the substage and the upper lens cell projecting into a recess 19 in the fixed stage. Held in the upper lens cell 18 is a lens member 18' which is focusably mounted in optical alignment with a lower lens member 17' which is secured in the lower lens cell 17 by means to be described hereinafter.

In order to convert the substage lighting mechanism 14 from an Abbe type of substage illumination in which both the upper and lower lens parts have a fixed relation to each other, into a variable focus type of mechanism in which the two lens cells are movable relative to each other, a cylindrical vertical mounting surface 20 is provided on the lower lens cell 17. A bore 20' is formed in lens cell 18 for contact with the mounting surface 20 with which it is slidably fitted. Relative motion toward each other of cells 17 and 18 is limited by two aligned abutment surfaces 21 on the upper cell and 22 on the lower cell. Fixed on the underside of the stage 11 is a mounting and retaining plate 23, said plate being attached thereon in any suitable manner such as by the screws 24. Centrally of the plate 23 is formed a bore 23' which is slidably fitted to the contiguous peripheral surface of the upper lens cell 18. Upward motion of the upper lens cell 18 is limited by a radial shoulder 25 formed on the outer part of said lens cell so that it abuts against a mating and aligned shoulder 26 formed on the plate 23. In this way, the upper lens cell is mounted for sliding motion which is limited by the radial abutment 22 for downward motion and the shoulder 26 for upward motion.

According to this invention, separable connecting means are provided for uniting the upper and lower lens cells to provide the aforesaid Abbe type of substage lighting or alternatively uniting the upper lens cell 18 and the fixed stage 11 to provide the aforesaid variable focus type of substage lighting. Said separable connecting means comprises a coupling member or ring 29 which encircles the lens cells and is provided with an internally projecting flange 30, which is rotatably and slidably fitted on the periphery of the upper lens cell 18. Said separable connecting means comprises additionally and preferably a threaded annular neck 31 depending from the stage plate 23 which is engageable with an internally threaded portion 32 on the coupling member 29. Similar separable connecting means are formed on the upper peripheral portion of the lower lens cell 17 at 33 so as to engage corresponding threads 34 formed on the coupling member 29. A pair of lateral abutment surfaces 35 and 36 is formed in axial alignment with each other on the periphery of the lower part of the upper lens cell 18, the lower abutment surface 36 being formed on a projecting rim 37 thereof. The flange 30 on the interior part of the coupling member 29 is positioned between the surfaces 35 and 36 so that in one position of operation of said substage lighting mechanism, the flange engages against the lower abutment surface 36 and in the other condition of operation the flange engages against the abutment surface 35.

With regard to the operation of this invention, when the flange 30 is clamped against the abutment surface 36, by engagement of the threads 33 and 34, the upper and lower lens cells are united and an Abbe type of substage lighting mechanism is thereby provided. With the upper and lower cells 18 and 17 thus clamped together both lenses 17' and 18' have a fixed relation to each other and the entire condenser may be freely moved by the control knob 13 back and forth within the stage opening 23'. When the coupling ring is disengaged from the thread 33 and is raised so that threads 31 and 32 may be engaged, the flange 30 abuts beneath the abutment surface 35 and thus forces the upper cell 18 against the abutment 26 on the stage plate 23 to provide a variable focus type of substage lighting mechanism wherein the lower cell is moved by the substage 12 while the stage 11 holds the upper cell 18 stationary.

It will be understood that the separable connections 31, 32 and 33, 34 are merely the preferred form of this invention and may take other forms and still effectively lock the coupling member 29 to an adjacent member lying either thereabove or therebelow.

Other changes in the mechanical details and the form and combination of parts may be made within the spirit of this invention, reference being had to the claims appended hereto for the scope of this invention.

We claim:

1. Substage light condenser mechanism for a microscope having a stage and a movable substage aligned therewith comprising the combination of a lower lens cell supported by the substage in substantial optical alignment with an objective on said microscope, an upper lens cell axially slidably mounted on the lower lens cell for movement between terminal upper and lower operative positions which correspond respectively to the positions occupied in the focusing type of lighting and the Abbe type of lighting, means including a separate exterior coupling member having coupling elements thereon which are engageable with corresponding coupling elements formed on the upper and lower lens cells respectively to connect alternatively either the upper lens cell and said stage or the upper lens cell and the lower lens cell whereby said mechanism is converted from an Abbe type to a variable focusing type of condenser mechanism.

2. In a microscope having a stage and an underlying movable substage, a light condenser mechanism comprising the combination of a lower lens cell which is supported by said substage, an upper lens cell slidably mounted for relative axial motion on the lower lens cell, said upper lens cell when in its highest position being seated against said stage, a pair of mutually facing abutment surfaces formed on the periphery of said upper cell invertically spaced relation with each other, a coupling member encircling said lens cells and having an inwardly directed flange formed thereon extending between said abutment surfaces, first separable connecting means cooperatively formed on the adjacent parts of the coupling member and the stage to secure the upper cell to the stage when said flange is engaged beneath the upper one of said pair of surfaces so as to hold said cell against the stage, and second separable connecting means cooperatively formed on the contiguous parts of the coupling member and lower lens cell to draw said flange against the lower one of said pair of abutment surfaces to effectively unite the cells, the mating parts of the first and second connecting means being so relatively spaced and arranged with respect to each other and with respect to said flange that one means is rendered inoperative when the other means is rendered operative, whereby the condenser mechanism is converted from an Abbe type to a variable focusing type of lighting mechanism or vice versa.

3. In a microscope having a stage and a vertically movable substage thereunder, an optical condenser supported by said substage substantially coaxial with the optical system of the microscope, said condenser comprising a lower lens cell secured in said substage and an upper lens cell which is slidably mounted on the lower cell and abuts against said stage when the cell is in its highest position, said cells having aligned abutments thereon for limiting relative motion toward each other, a pair of lateral abutment surfaces formed on the periphery of said upper lens cell and facing each other in axially spaced relation, a coupling member having an inwardly projecting flange positioned in the space between said abutment surfaces and being mounted for vertical movement to carry said flange into contact with one or the other of said surfaces, first separable connecting means formed cooperatively on the adjacent parts of the stage and member so as to be operable for forcing said flange up against the upper one of said abutment surfaces to clamp the upper lens cell against said stage in one condition of operation, and second separable connecting means which are so spaced from the first connecting means that the first means is disengaged when the second means is engaged, said second connecting means being cooperatively formed on the lower side of said member and the adjacent part of the lower lens cell so as to force said flange against the lower of said abutment surfaces when said first connecting means are disengaged and thus unite the upper and lower lens cells whereby said condenser is converted from an Abbe type of condenser mechanism to a variable focusing type of condenser mechanism or vice versa.

4. A microscope including a stage and a relatively movable substage located thereunder, substage lighting mechanism therefor comprising a lower lens cell supported by said substage substantially in alignment with the optical system of the microscope, said cell having a vertical mounting surface terminating at the bottom in a radial abutment, an upper lens cell slidably mounted on said surface for focusing movement, the lower part thereof nearest to said abutment being externally formed in the shape of a protruding rim which carries said abutment, aligned seating surfaces formed respectively on the upper lens cell and stage for defining the uppermost position of said upper cell, a pair of vertically spaced and opposed lateral abutment surfaces formed on the periphery of said upper cell, the lower one of said surfaces being formed on said rim, a coupling ring mounted for vertical movement on said upper cell and having an internally directed flange which lies between said surfaces and is movable thereby into contact with either one or the other of said abutment surfaces, a separable inclined connection jointly formed on the stage and ring to force said flange upwardly against the upper one of said abutment surfaces, and a second separable inclined connection formed jointly on the adjacent portions of said ring and said lower lens cell to draw said flange down against said lower abutment surface and thus effectively unite the upper and lower cells, the spacing between part of the separable connection which is on the lower lens cell and the stage part of said separable connections being spaced apart by a greater distance than the mating parts of said connections on said ring sufficiently to prevent more than one of the connections being operative concurrently whereby said lighting mechanism may be converted from the Abbe type to the variable focus type of mechanism or vice versa.

References Cited in the file of this patent

UNITED STATES PATENTS

| 2,373,559 | Hall | Apr. 10, 1945 |
| 2,594,756 | Fischer | Apr. 29, 1952 |

FOREIGN PATENTS

| 251,889 | Switzerland | Sept. 1, 1948 |